United States Patent [19]

Kim

[11] Patent Number: 4,716,072
[45] Date of Patent: Dec. 29, 1987

[54] MULTILAYER COMPOSITE STRUCTURE FOR SMOOTH SURFACES

[75] Inventor: Bang M. Kim, Schenectady, N.Y.

[73] Assignee: General Electric Company, Schenectady, N.Y.

[21] Appl. No.: 947,152

[22] Filed: Dec. 29, 1986

[51] Int. Cl.$^4$ .............................................. B32B 3/26
[52] U.S. Cl. .................................... 428/212; 428/236; 428/251; 428/285; 428/286; 428/287; 428/409; 156/285; 156/322
[58] Field of Search ............... 428/236, 237, 251, 285, 428/286, 287, 212, 409; 156/285, 322

[56] References Cited

U.S. PATENT DOCUMENTS 4,617,225 10/1986 Horn .................................. 428/285

Primary Examiner—Marion C. McCamish
Attorney, Agent, or Firm—William H. Steinberg; James C. Davis, Jr.; Paul R. Webb, II

[57] ABSTRACT

Composite sheets with layers possessing different properties are provided which can be compression molded to produce molded panels with smooth glossy surfaces. A fiber free outer layer is laminated to a bulk layer comprising fiber mat compounded with thermoplastic resin filled with chopped fibers. The fiber free layer has a higher melt viscosity than the bulk layer.

14 Claims, 8 Drawing Figures

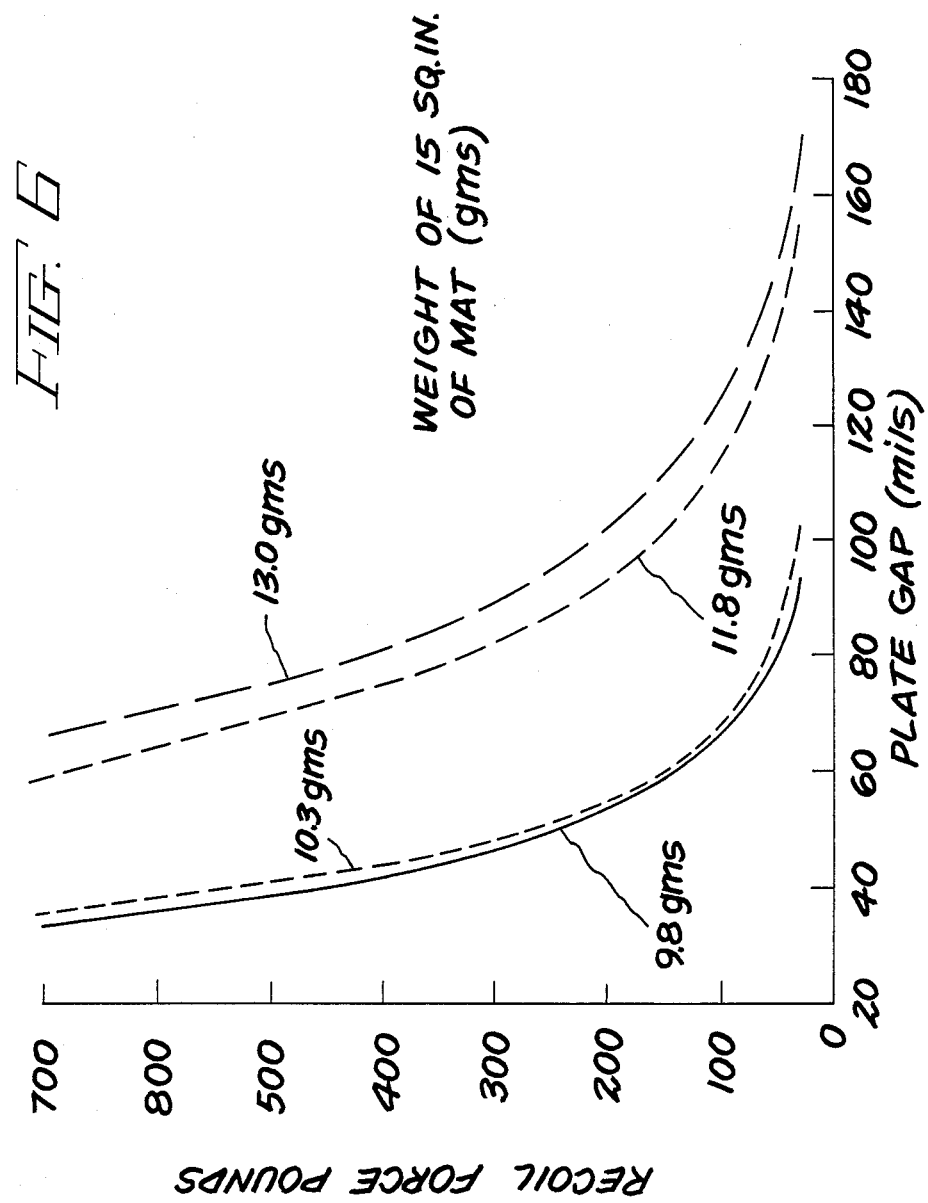

MULTILAYER COMPOSITE STRUCTURE FOR SMOOTH SURFACES

BACKGROUND OF THE INVENTION

The present invention relates to laminated fiber reinforced composite sheets which can be compression molded and produce smooth glossy surfaces.

The use of glass reinforced thermoplastics for automobile exterior parts is currently being investigated. One approach for producing relatively thin and wide parts such as hoods, roofs and doors is compression molding of composite blank sheets. Experiments conducted to mold shaped panels from conventional glass reinforced blank sheets resulted in panels with surface imperfections. A smooth, glossy surface finish is an important requirement for automobile exterior applications. The surface imperfections were caused by fiber bundles at the surface and voids due to incomplete filling of the mold caused by trapped gas bubbles.

Another technique under development to produce smooth glossy finishes involves a two step operation. The composite is first compression molded and then polymer melt is injected into a very thin space between the mold and the composite.

It is an object of the present invention to provide composite sheets which can be compression molded and produce a smooth glossy surface.

It is a further object of the present invention to provide a fiber reinforced composite sheet which can be used with a single step compression molding cycle to fabricate fiber reinforced shaped composite panels with smooth glossy surfaces.

It is a still further object of the present invention to provide fiber reinforced composite sheets which achieve a smooth glossy surface and reduced thermal shrinkage when compression molded.

It is yet another object of the present invention to provide fiber reinforced composite sheets having high flexural and tensile strengths.

SUMMARY OF THE INVENTION

In one aspect of the present invention, a composite sheet is provided comprising a fiber free outer layer of thermoplastic resin and a bulk layer of fiber mat and thermoplastic resin. The fiber free outer layer has a higher melt viscosity than the inner bulk resin to limit the movement of fiber bundles from the bulk layer to the fiber free layer. The bulk layer comprises fiber mat compounded with low melt viscosity resin filled with chopped fibers.

BRIEF DESCRIPTION OF THE DRAWING

While the specification concludes with claims particularly pointing out and distinctly claiming the present invention, the objects and advantages can be more readily ascertained from the following description of preferred embodiments when read in conjunction of the accompanying drawing in which:

FIG. 6 is a graph showing the results of compression tests on 15 square inch fiber mats.

DETAILED DESCRIPTION OF THE INVENTION

Examination of compression molded shaped glass fiber reinforced shaped panels resulted in the identification of several major causes of surface roughness. The causes were the presence of fiber bundles at or close to the surface, voids at the surface, gas trapped inside the mold, uneven distribution of high recoil forces of glass fibers and uneven shrinkage of the composite material due to differential shrinkage of the resin and fiber. Once glass fibers are present close to the surface, differential thermal shrinkage of the resins and fibers during cooling causes surface irregularities. Fiber bundles at the surface of the molded shaped panel are caused by the following: fiber bundles being present at the surface of the glass reinforced blank sheets; fibers under stress moving to the surface during the melting of the resin; and fiber moving to the surface with the flow of resin during the compression molding process.

Figure 1A:
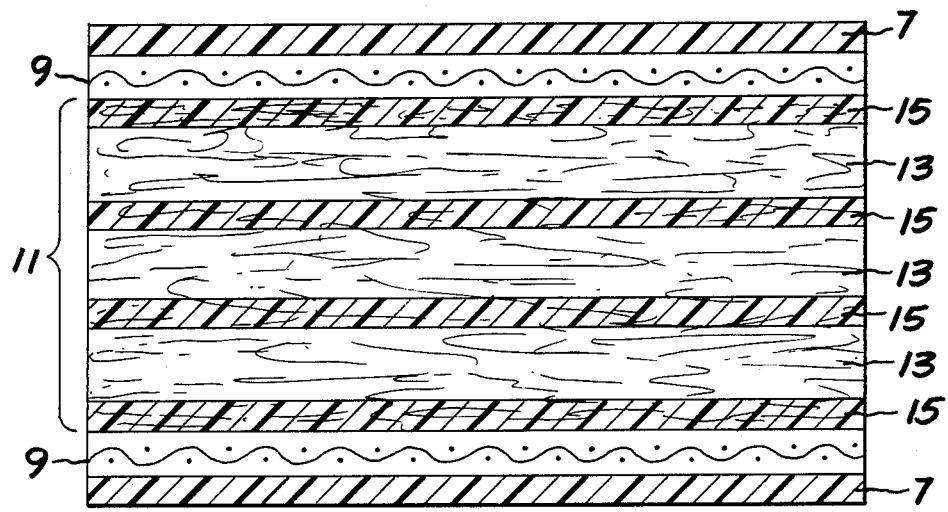
FIGS. 1A and 1B are cross-sectional views of composite sheets both shown prior to compression molding but before and after lamination, respectively, in accordance with the present invention.

A smooth glossy surface can be obtained by using compression molding by providing a fiber reinforced sheets comprising materials made with different layers having different properties. Referring now to the drawing wherein like numerals refer to like elements throughout and particularly to FIG. 1A thereof, a composite sheet with a symmetrical structural is shown prior to lamination. An outer layer 7 on either side of the sheet comprises neat resin of higher viscosity thermoplastic having a higher melting point. The resins to be used for such applications are individual or blends of polycarbonate, polyamide, polyimide, polybutylene-terephthalate, polymethalene-terepthalate, polyethylane, polypropylene, polyphenylene oxide, acrylonitride butadiene styrene etc. The viscosity of a resin is dependent upon the type of the resin, molecular weight and the process temperature. A higher viscosity material can be selected based on the melt viscosity data at a specific temperature. If the same type (chemical formula) of resin is used for both inner and outer layers, a higher molecular resin should be chosen for the outer layer. Polymers with a branched molecular structure have a higher viscosity than those with linear structure. While the outer layer should be free of fiber bundles, it may contain other filler materials such as pigments, glass or or mica materials in the form of ultra small fibers, flakes or powders to improve surface properties. A second layer below the outer layer 9 comprises a glass, polymer or metal screen or porous sheet which serves as a barrier structure to limit movement of fiber bundles to the surface. When the composite sheet is in compression in subsequent molding steps, the screen should be capable of conforming to the geometry of the mold to be used and loosely woven screens are preferred. Double knitted or corrugated sheets of glass or polymer can alternatively be used.

Figure 1B:
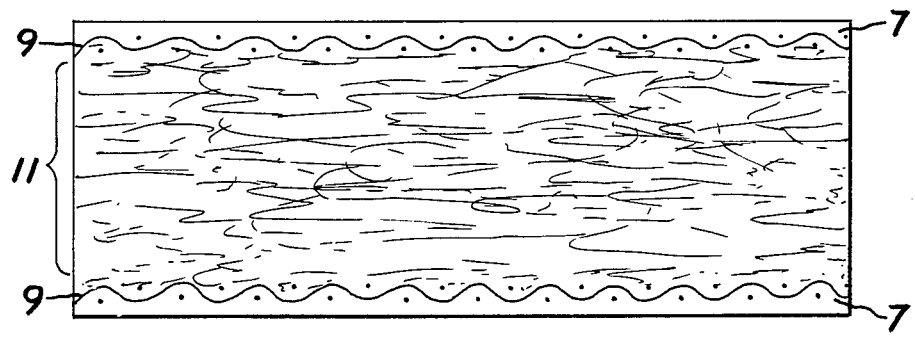

The third layer begins the bulk portion 11 of the composite which forms the central portion of the sheet. The third layer comprises long glass fiber mats 13. The fiber layers should be arranged to facilitate transverse movement to allow conformation with mold geometry. The fiber layers should also have a uniform thickness to provide uniform fiber bundle flow and to eliminate nonuniform recoil forces of the fiber mat. The fiber mats are impregnated with resins 15 filled with short thin glass fibers, which are produced by extruding glass filled resin pellets. The resin is of lower viscosity than the resin for the outer layer 7. A neat resin may be employed for the inner layer. Resins with lower viscosities can be selected from viscosity data of particular resins at a specific process temperature. If the same type of resin is used for both inner and outer layers, a lower molecular weight resin should be chosen for the inner layer. Examples of outer and inner resins are polycarbonate or blends of polycarbonate and polybutylene terephthalate for the outer layer and polybutylene terephthalate for the inner layer. Other fillers can be used to replace the short thin glass fibers such as powders of glass (silica), talc, clays and calcium carbonate or discs of mica or glass. The fillers reduce differential shrinkage between the resin and the mats. The addition of chopped glass fiber fillers to the glass fiber mat increases the total glass content of the composite, which increases the mechanical strength of the composite. The bulk portion can comprise additional layers of glass fiber mat and resin containing short fibers or powder. The layers are laminated together to form a composite sheet as shown in FIG. 1B. The symmetrical structure of the sheet reduces warpage. However, the symmetrical structure is preferred but not essential.

Figure 2:
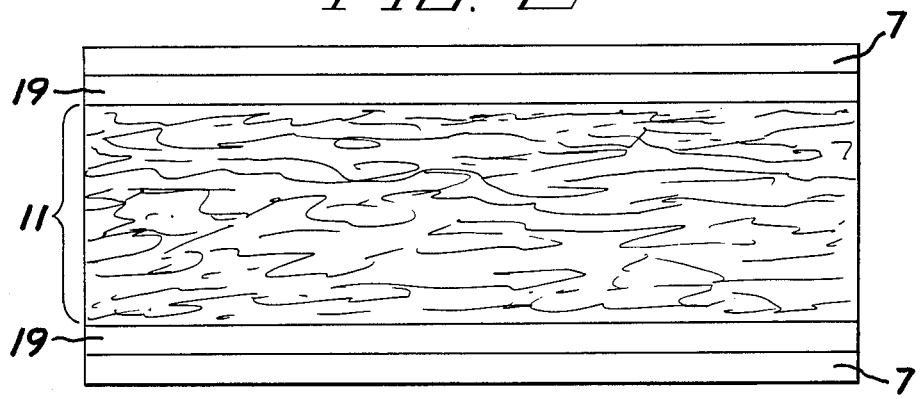
FIGS. 2–4 are cross-sectional views of different embodiments of fiber reinforced composite sheets in accordance with the present invention with FIGS. 2 and 4 shown after lamination and FIG. 3 shown before lamination.

Referring now to FIG. 2 another embodiment of the present invention is shown. The outer layer is a fiber free layer 7, the property of which is determined by the surface requirement of the composite product. For example, an oil resistant resin layer is required for automobile parts. The second layer 19 situated beneath the outer layer is a more viscous (higher molecular weight) resin than the inner layer, used to prevent movement of the fiber bundles contained in the bulk layer 11 to the surface. The next layer begins the bulk portion 11 and comprises resin, preferably containing short fibers or powder as previously described. A mat of glass fiber is in the next layer. A plurality of glass fiber mat and resin layers form the bulk portion 11 which comprises the central portion of the sheet.

Figure 3:
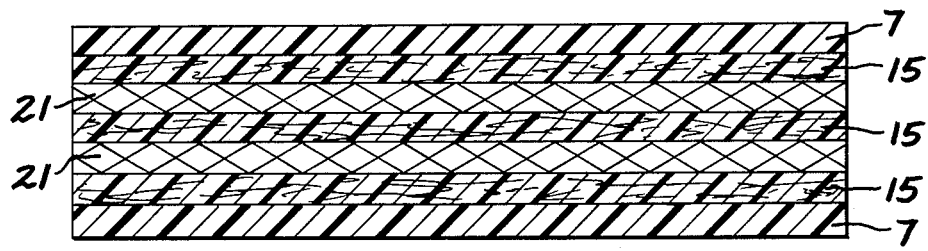

Referring now to FIG. 3, the outer layer of the composite is a fiber free layer 7 and is more viscous than the bulk layer of the composite. The bulk layer comprises resins 15 filled with short thin glass fibers, which are produced by extruding glass filled resin pellets. The bulk layer is made of at least one layer of woven fabric of glass fibers 21. Such a woven fabric does not have problems of movement of fiber bundles to the surface, while providing high mechanical strength.

Figure 4:
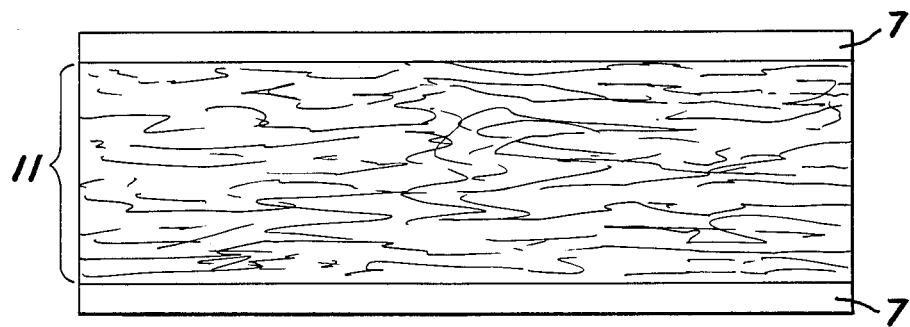

Referring now to FIG. 4 a fiber free layer 7 is provided at the outer surfaces of the sheet. The outer fiber free layer is at a lower temperature than the inner bulk layer when the layers are laminated together. The outer layer and the inner bulk layers are of the same type material. During lamination of the surface layers to the bulk layers, movement of the fibers of the bulk layers to the surface is prevented because the lower temperature of the outer layer causes the outer layer to be more viscous. The bulk layers and the fiber free outer layers are heated to above the melting point or softening point of the resin but are at temperatures that differ by more than 10° C. This type of composite sheet can preferably be used in stamping and other cold forming operations.

Figure 5A:
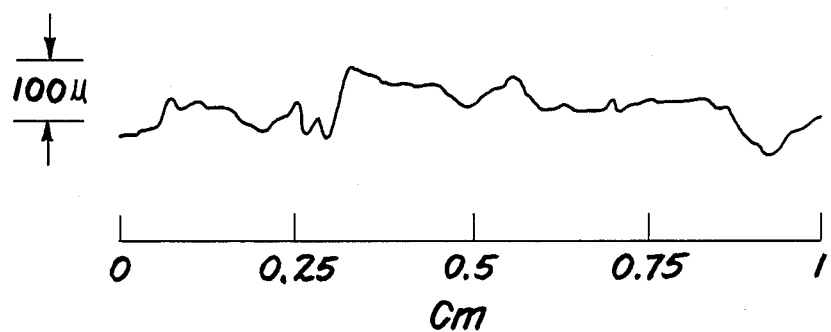
FIGS. 5A and B are graphs of the output of a mechanical profilometer of glass fiber reinforced Valox ® composite product and a product with a fiber free layer in accordance with the present invention, respectively.
Figure 5B:
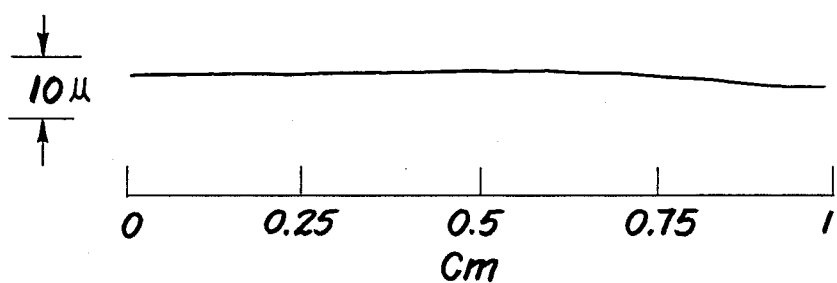

Referring now to FIG. 5A a graph of the output a mechanical profilometer showing the surface roughness of a glass fiber reinforced Valox product made from sheet which does not have a fiber free outer layer and which has been compression molded is shown. FIG. 5B shows a graph of the output of a mechanical profilometer showing the surface smoothness of a glass fiber reinforced Valox sheet with a neat Xenoy layer at the surface in accordance with the present invention which has been compression molded. A significant improvement of surface smoothness has been achieved with the use of the fiber free layer.

To assure that there is no surface waviness in any of the composite sheets due to uneven distribution of high recoil forces of glass fibers and uneven shrinkage due to differential shrinkage of resin and fiber, the glass fiber mat used in the different embodiments shown is preferably made of thin fibers in small fiber bundles. Measurements taken of recoil forces of different fiber mats in FIG. 6 show that a glass fiber mat made of thin fibers in small fiber bundles significantly reduces recoil forces.

Two 15 square inch samples of a first fiber mat weighing 9.8 grams and 10.3 grams where compressed together between two plates. The graph shows the force in pound weight necessary to achieve a corresponding plate gap measured in mils. Two 15 square inch samples were taken of a second fiber mat weighing 11.8 grams and 13.0 grams, and the force necessary to compress the mats between plates which is a measure of the recoil force of the mat. The first fiber mat comprises uniformly arranged fiber bundles having fewer fiber per bundle than the second mat. The fibers in the bundles of the first mat were smaller than the fibers in the second mat. The bundles in the second mat were less uniformly arranged than the first mat. It has been found that fiber mats that require less than 50 psi of pressure to compress an unimpregnated mat sufficiently so that the glass content of the mat would be 50% by weight of the total product weight assuming the spaces in the compressed mat were filled with resin. The pressure necessary to achieve impregnation is of course greater. The 50 psi measurement is used to determine how compressible the mat is and is an approximate upper limit of mats' recoil force for production of smooth surfaces.

In order to increase the glass fiber content of the mat, individual thin, short glass fibers are added into the space between the long glass fibers to reduce the thermal shrinkage of the composite and increase the mechanical strength of the composite. The inner bulk composite portion can be made of layers starting with a fiber mat made of long fibers and short thin fibers. Alternatively, the long glass fiber mats impregnated with resins filled with short, thin glass fibers which are produced by extruding glass filled resin pellets. Other fillers which can be used in place of the short, thin fibers are powders of glass (silica) talc clays and calcium carbonate or discs of mica or glass.

Voids at the surface of a compression molded composite panel are caused by gases trapped between the mold and resin. Maintaining a vacuum in the mold is helpful in removing gases trapped between the mold and the resin. It is also possible to mold under an environment of gases which are highly soluble in the resin used in the composite sheet.

The foregoing has described a fiber reinforced composite sheet with high flexural and tensile strengths which can be compression molded and retain a smooth glossy surface.

It is understood that the foregoing detailed description is given merely by way of illustration and many modifications can be made therein without departing from the spirit or the scope of the present invention.

What is claimed is:

1. A composite sheet comprising:
   a fiber free layer of thermoplastic material; and
   a bulk layer comprising fiber mat compounded with thermoplastic resin, the fiber free layer laminated to the bulk layer, said thermoplastic material in the fiber free layer having a higher melt viscosity than the thermoplastic resin in the bulk layer to limit the movement of fibers from the bulk layer to the fiber free layer.

2. The composite sheet of claim 1 wherein the resin in the bulk layer is filled with chopped, fibers.

3. The composite sheet of claim 1 wherein the mat when subjected to a pressure less than 50 psi is sufficiently compressed so that if the spaces between the fibers were filled with resin, the fiber would comprise 50% of the weight.

4. The composite sheet of claim 1 wherein the thermoplastic material in the fiber free layer selected from the group consisting of polycarbonate and a blend of polycarbonate and polybutylene terephthalate and the resin in the bulk layer comprises polybutylene terephthalate.

5. A composite sheet comprising fiber mat and
   a fiber free outer layer of thermoplastic material;
   a bulk layer comprising fiber mat and thermoplastic resin;
   barrier means situated between said fiber free layer and said bulk layer, said fiber free layer, bulk layer and barrier means laminated together, said barrier means limiting movement of fibers from said bulk layer to the fiber free layer.

6. The composite sheet of claim 5 wherein said barrier means comprises a woven screen.

7. The composite sheet of claim 5 wherein said barrier means comprises a porous sheet.

8. The composite sheet of claim 5 wherein said barrier means comprises a layer of thermoplastic material having a higher viscosity than the bulk inner layer.

9. The composite sheet of claim 5 wherein said fiber free outer layer of thermoplastic material has a higher viscosity than the resin in the bulk layer.

10. The composite sheet of claim 5 wherein the thermoplastic resin of said bulk layer has chopped fiber to reduce thermal shrinkage and increase composite strength of the bulk layer.

11. A composite sheet comprising:
    a fiber free layer of thermoplastic material; and
    a bulk layer comprising woven glass fiber mat compounded with thermoplastic resin containing glass fibers, the fiber free layer laminated to the bulk layer, said thermoplastic material in the fiber free layer having a higher melt viscosity than the thermoplastic resin the bulk layer.

12. A method of making fiber reinforced composite sheets, comprising the steps of:
    (a) heating a fiber free thermoplastic resin layer to a temperature greater than the melting point.
    (b) heating a fiber mat and thermoplastic resin to a temperature higher than the fiber free thermoplastic resin layer, the fiber free thermoplastic resin layer and thermoplastic resin layer heated with the mat having substantially the same melting point, the fiber free thermoplastic resin being heated sufficiently less so that the resin in the fiber layer is more viscous than the resin heated with the mat; and
    (c) pressing the fiber free resin layer, the fiber mat and resin together so that the fiber free resin layer is on the exterior of the sheet.

13. The method of claim 12 wherein the resin in step b is heated to a temperature more than 10° C. higher than the resin of step a.

14. The method of claim 12 wherein the resin in step a and b are the same.

* * * * *